Aug. 3, 1943.    C. H. DEERWESTER ET AL    2,325,835
STABILIZER
Filed June 25, 1941    3 Sheets-Sheet 1
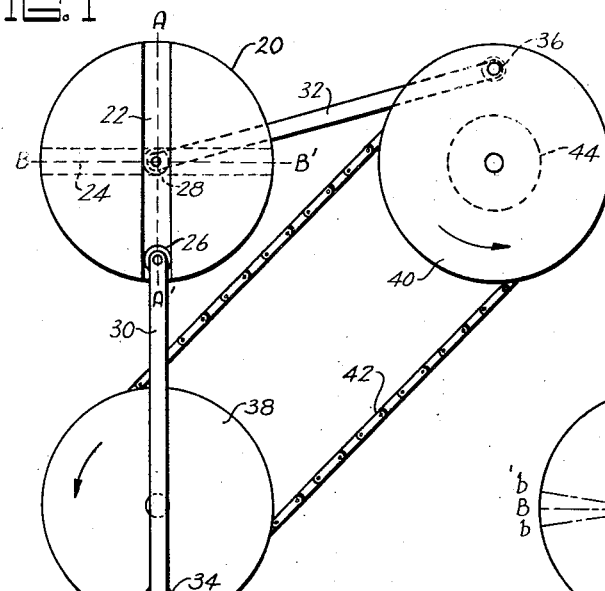
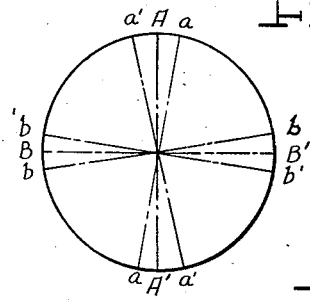
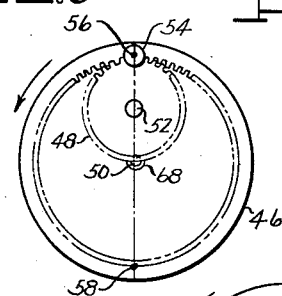
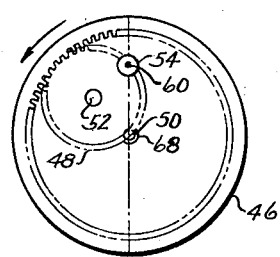
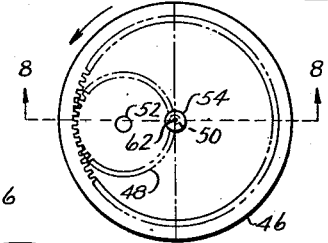
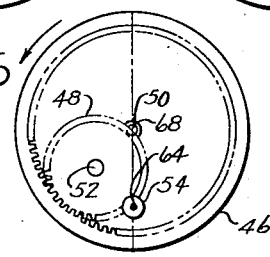
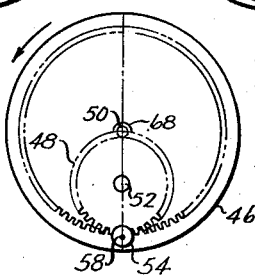
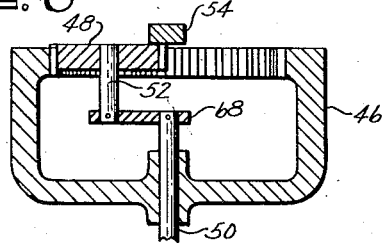
INVENTORS
CHARLES H. DEERWESTER
LESTER D. BEDELL

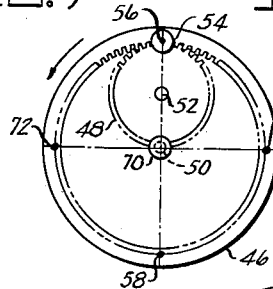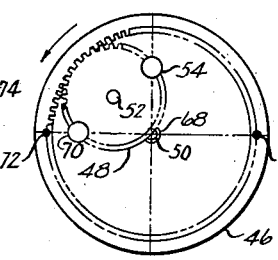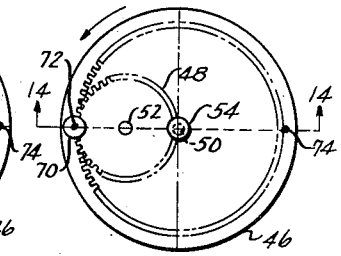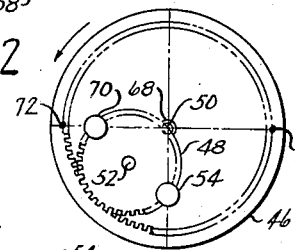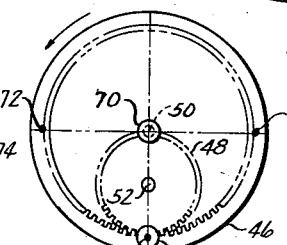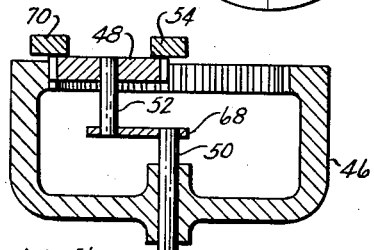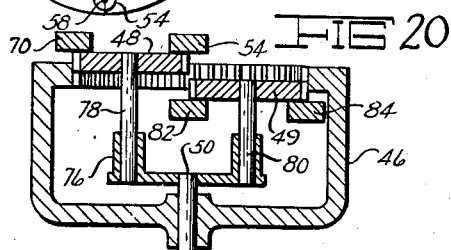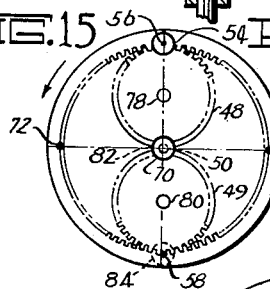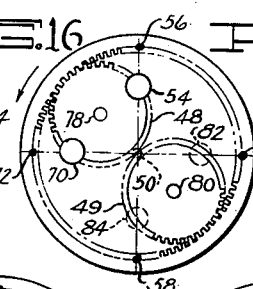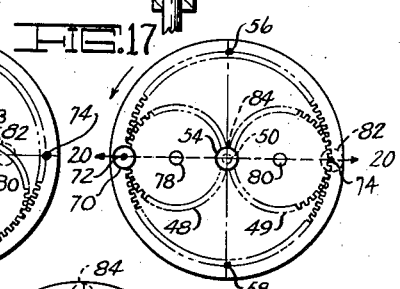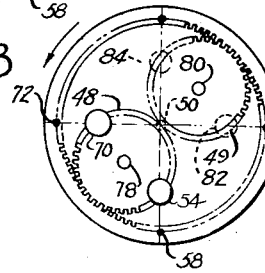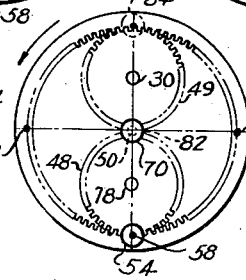

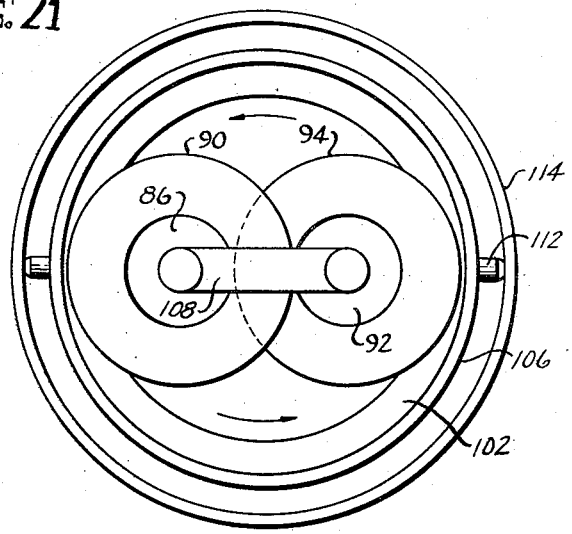
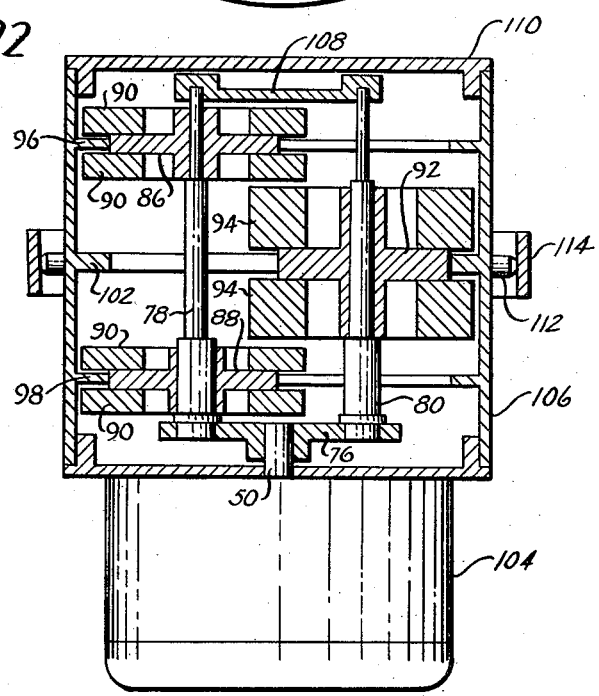

Patented Aug. 3, 1943

2,325,835

UNITED STATES PATENT OFFICE 2,325,835

STABILIZER

Charles H. Deerwester, Washington, D. C., and Lester D. Bedell, Harrisburg, Pa.

Application June 25, 1941, Serial No. 399,762

7 Claims. (Cl. 74—604)

The invention described herein may be manufactured and used by or for the Government for governmental purposes, without the payment to us of any royalty thereon.

This invention relates to stabilizers and comprises a mechanism which, although not constituting a gyroscope, is an effective substitute in many situations in which a gyroscope is now being used.

An object of the invention is to provide a device of this character which does not exactly follow the behavior of a gyroscope, particularly the faculty of precession which is inherent in the gyroscope of common practice.

More specifically, an object of the invention is to provide a device of this character in which the inertia masses, instead of moving in circular paths as in a gyroscope, move back and forth in straight lines, and within selected limitations, and always in a plane which passes through the spin axis, to the end that, when the axis is displaced, no couple is set up at right angles to the plane of displacement.

Other advantages will appear as the invention is further described, references being had to the drawings, wherein, Fig. 1 is a schematic plan view showing the principle of the invention in the simplest form.

Fig. 2 is a diagram used to further illustrate the principle involved in Fig. 1.

Figs. 3 to 7 are diagrammatic views showing how toothed gearing may be used for putting the invention into practice.

Fig. 8 is a vertical axial section taken at 8—8 of Fig. 5.

Figs. 9 to 13 are diagrammatic views showing a further development of the toothed gear structure.

Fig. 14 is a vertical axial section taken at 14—14 of Fig. 11.

Figs. 15 to 19 are diagrammatic views showing a further development of the mechanism shown in Figs. 3 to 14.

Fig. 20 is a vertical axial section taken at 20—20 of Fig. 17.

Fig. 21 is a top plan view of a practical embodiment of the device.

Fig. 22 is a vertical axial section through the structure shown in Fig. 21.

Referring now particularly to Fig. 1, a disc 20 has a channel 22 in its upper side, and a like channel 24, at right angles to channel 22, in its lower side.

Weights 26 and 28 are slidable in channels 22 and 24 respectively, reciprocatory movement of the weights in the channels being imparted by connecting rods 30 and 32, which are in turn operated by crank pins 34 and 36 in pulleys 38 and 40 which are preferably connected by a silent chain 42 or similar positive drive which will maintain them in synchronous rotation. Any suitable power means, such as a motor 44 may be assumed.

If, while the disc 20 is in a horizontal plane, rapid reciprocatory movement is imparted to the weights 26 and 28 by the power means provided for that purpose, the disc will resist being tilted out of the horizontal plane. Thus if it is tilted on the axis A—A', downward at B and upward at B' it will resist being tilted but will not set up any force tending to tilt it on the axis B—B' as would be the case in a gyroscope.

Similarly, if additional weights are added and arranged to reciprocate on the lines $a-a$, $a'-a'$ and $b-b$, $b'-b'$ (see Fig. 2), tilting about the axis A—A' will still not set up a couple tending to tilt the disc about the axis B—B'. The embodiment represented by Figs. 1 and 2 is shown for illustrative purposes only, a more practicable means of putting the invention into effect being shown in Figs. 3 et seq.

Referring now more particularly to Figs. 3 to 7 inclusive, an internally toothed ring gear 46 has an even number of teeth and an externally toothed gear 48 having exactly half as many teeth as the ring gear is in constant mesh therewith, the externally toothed gear being mounted to revolve about the axis 50 of the ring gear and will be caused to rotate about its own axis 52 in so doing.

If now, in any position to which the gear 48 may have revolved, a weight is affixed thereto at the point of tangency of the pitch circles of the two gears, further revolving of the gear 48 will move the weight from the point of tangency across a pitch diameter of the ring gear.

Thus, in Fig. 3, a weight 54 is attached to the external gear 48 at 56, the point where the pitch circles of gears 46 and 48 are, for the moment, tangent. If the gear 48 is now revolved anti-clockwise through half its orbit, the weight 54 will be moved across a pitch diameter of the ring gear 46 from 56 to 58.

Figs. 4 to 8 show other positions of the weight 54 in the course of its movement. In Fig. 4, the external gear 48 has revolved through one eighth of its orbit, moving the center of the weight to 60, while in Figs. 5, 6 and 7, the gear has moved farther through its orbit, moving the weight through points 62 and 64 to the extremity of its straight line movement at 58. Revolving the gear 48 an additional one hundred and eighty degrees will return the weight across the diameter from 58 back to 56. Fig. 8 shows the shaft 50 with crank 68 and crank pin 52 for moving the gear 48 through its orbit within the gear 46.

The mechanism shown in Figs. 3 to 8 has capacity for moving a single mass only, and for moving it across a single pitch diameter of the ring gear, and, in order to incorporate this principle in a structure which will function as heretofore described relative to Figs. 1 and 2, a second weight may preferably be added as indicated in Figs. 9 to 14.

In Fig. 9, a second weight 70 is shown, the weight being placed on the gear 48 diametrically opposite the first weight 54. When the first weight 54 is now brought to the point of tangency 56 between the two gears 46 and 48, the second weight 70 will be at the axis of the shaft 50.

If the shaft 50 is now rotated one turn, thereby causing a complete anti-clockwise revolution of the crank pin 52 about the axis of the shaft 50, the gear 48 will have made two turns on its crank pin 52, the weight 54 will have moved from 56 to 58 and back to 56, and the second weight 70 will have moved from 50 to 72 to 50 and 74 and back to 50. Figs. 10 to 13 show the weights in their course across their respective pitch diameters, and Fig. 14 represents the same structures as described with respect to Fig. 8, except for the addition of the second weight 70.

The mechanism thus far described fulfills the requirements of the device demonstrated by Figs. 1 and 2 in that two weights are oscillated through limited paths which are angularly spaced ninety degrees in the same plane, and, since the oscillatory movement is produced through toothed gearing, the relative sequence of the two movements is maintained. By reference to Fig. 14, however, it will be seen that while the weights 54 and 70 are so placed on the gear 48 as to bring the gear and weights into balance with respect to the axis 52, there is an unbalanced condition with respect to the axis 50.

Figs. 15 to 20 inclusive show a further extension of the principles of the invention in a device which is statically although not dynamically balanced. Here, instead of the single crank 68 with crank pin 52 on shaft 50 as in Fig. 14, the shaft 50 (see Fig. 20) has a disc 76 with two crank pins 78 and 80 respectively supporting the gears 48 and 49 for rotation about their respective axes and revolution about the axis of the shaft 50.

The gear 48 as before has weights 54 and 70 secured to its upper side, diametrically opposite each other on its pitch diameter, while the additional gear 49 has weights 82 and 84 secured to its under side, also diametrically opposite and on its pitch diameter. When the shaft 50 has been given one turn anti-clockwise rotation, the weight 54 will have moved in a straight line from 56 to 58 and back to 56, the weight 70 will have moved from 50 to 72 to 74 and back to 50, the weight 82 will have moved from 58 to 74 to 72 and back to 50, and the weight 84 will have moved from 58 to 56 and back to 58.

Thus it will be seen that there are two weights in continuous oscillation between 56 and 58 but always in opposite directions, and there are two weights in continuous oscillation in a path at right angles to the path of the first two weights, between 72 and 74, the latter two weights likewise always moving in opposite directions. In this embodiment, toothed gearing should be employed so that the same relative movements between the weights may be maintained. By reference to Fig. 20, however, it will be seen that this form of the invention is in static but not dynamic balance.

It will now be apparent that if an infinite number of weights were secured to the gears 48 and 49 around their peripheries with the centers of gravity of the weights on the pitch circle of the gears, each weight would oscillate from the point where its center of gravity becomes coincident with the point of tangency of the gears, in a straight line, across a pitch diameter of the ring gear 46, and there would always be two weights in the same axial plane moving in opposite directions.

Concentrating an infinite number of weights on the pitch line of the revolving gear may preferably be accomplished by arranging the several parts as shown in Figs. 21 and 22. In this embodiment, static balance is achieved as it is in Fig. 20, the main drive shaft 50 having a disc 76 which carries two opposite revolving crank pins 78 and 80, the axes of which are parallel to the axis of shaft 50 and at radially equal positions with respect thereto.

Pin 78 rotatably supports the axially spaced apart gears 86 and 88 both of which have attached to their sides the rims 90, while pin 80 rotatably supports a single gear 92 midway between gears 86 and 88, the gear 92 having attached to its sides the rims 94 which are of double the thickness and consequently double the weight of rims 90. Gears 86 and 88 are in engagement with ring gears 96 and 98, while gear 92 is in engagement with ring gear 102. Obviously, by thus mounting two spaced apart masses opposite one which is midway between them a dynamic as well as static balance is attained. The rims 90 and 94 are of such dimensions that the center of gravity of any cross section of a rim is on the pitch circle of the gear to which it is attached. Each infinite particle of a rim, therefore, functions as an individual weight which moves, not in a circular path, but in a straight line, each particle in a different direction and across a different pitch diameter of a ring gear 96, 98 or 102, and each such infinite particle has an equal particle moving in the same straight line but in an opposite direction.

The friction gear wheels 86 and 88 and 92, being merely carriers of the weight masses, may preferably be made as light as practicable, as may also the pins 78 and 80, the double crank 76, and the brace 108.

A slight degree of gyroscopic action may be present, due to the fact that the masses comprising pins 78 and 80, crank 76 and brace 108, move in circular paths and are thus subject to centrifugal force and may therefore be subject to precession, but in the main, the moving masses of the rims, due to their straight line movement, resist displacement from their normal plane in any direction and do not set up a couple at right angles to the displacing force as in a gyroscope.

Now while it is desirable that toothed gearing be used in an arrangement such as is shown in Fig. 20, to keep the several weights moving in a certain relation to each other, in the exemplification shown in Figs. 21 and 22, the teeth on the gearing may be omitted, and properly proportioned friction gear wheels employed instead, for, since the weights are infinite in number, any slight slippage which may occur between the friction wheels, as for instance between wheels 92 and 102, merely results in an exchange in position of different particles, and no out of step condition results.

In subsequent references to gears or gear wheels, it will be understood that the term may be applied to either a friction gear wheel or a toothed gear wheel.

A motor 104 is provided for rotating the main shaft 50, and a housing 106 is secured to the motor and carries the internal rings 96, 98 and 102.

The bracing member 108 supports the upper ends of the pins 78 and 80 to hold them in proper spaced relation, and a cover member 110 closes the top of the housing.

Gimbal pins 112 extend at opposite points from the housing 106, and a gimbal ring 114 provides bearing for the pins in the normal manner, and while the device, in the several embodiments herein shown, may be adapted for stabilizing pointers, indicating devices and other uses to which a gyroscope is now being put, no means is herein disclosed for connecting to an indicator or pointer, such means being no part of the present invention.

We claim:

1. The combination, in a stabilizing device, of a rotatable driving member, pins revolvable in an orbit by said driving member, said pins having their axes parallel to each other and parallel with the driving member axis, axially spaced external gear wheels having a pitch diameter of substantially the distance between the axes of the pins, rotatable on one of the pins, an external gear wheel of the same said pitch diameter rotatable on the other pin and situated axially between the first said gear wheels, annular weight masses carried on said external gear wheels, the centers of gravity of diametrically opposite axial cross sections of said weight masses being spaced a distance equal to the pitch diameters of the said gear wheels, and internal gear wheels of twice the pitch diameter of the said external gear wheels surrounding and drivably engaging said external gear wheels, non-rotatably held with their axes coincident with the axis of the driving member.

2. The structure of claim 1 wherein the gear wheels are friction wheels.

3. The structure of claim 1 wherein each external gear wheel has two of the said annular weight masses, one on each side.

4. The structure of claim 1 wherein the axially spaced external gear wheels which are on the said one pin each carry annular weights of only half the mass of the annular weights carried by the external gear wheel which is on the other pin.

5. The combination, in a stabilizing device, of a rotatable driving member, dametrically opposite bearing means carried on the driving member, said bearing means having their axes equidistant from and parallel with the driving member axis and parallel with each other, external gears rotatable on said bearing means, said external gears having pitch diameters equal to the distance between the axes of the bearing means, internal gear means surrounding said external gears and being in engagement therewith, means to non-rotatably support said internal gear means concentric with the driving member, and annular weight masses having a mean diameter equal to the pitch diameter of said external gears concentrically carried on the faces of said external gears.

6. The combination, in a stabilizing device, of internal gearing, external gearing within, and in engagement with, said internal gearing, the external gearing being of half the pitch diameter of the internal gearing, means non-rotatably supporting said internal gearing, bearing means for rotatably supporting said external gearing in engagement with said internal gearing, a driving member for revolving said bearing means in an orbit equal to the pitch circle of said external gearing, and weight masses arranged to revolve in unison with said external gearing, said masses having their axes coincident with said external gearing and a mean diameter equal to the pitch diameter of said external gearing.

7. In a stabilizing device, an internal gear, means for non-rotatably supporting said internal gear, an external gear of half the pitch diameter of the internal gear, in driving engagement with said internal gear, means to cause said external gear to revolve about the axis of said internal gear in an orbit of substantially the pitch diameter of the external gear, and an annular weight mass having a mean diameter of substantially the pitch diameter of the external gear, the external gear and the weight mass being drivably connected to revolve in unison with their axes coincident.

CHARLES H. DEERWESTER.
LESTER D. BEDELL.